United States Patent
Mittal et al.

(10) Patent No.: US 9,434,820 B2
(45) Date of Patent: Sep. 6, 2016

(54) POLYSILOXANE CO- OR TERPOLYMERS AND POLYMERS MADE THEREFROM

(71) Applicant: Momentive Performance Materials Inc., Waterford, NY (US)

(72) Inventors: Anuj Mittal, Bangalore (IN); Narayan Padmanabha Iyer, Bangalore (IN); Samim Alam, Tarrytown, NY (US); Indumathi Ramakrishnan, Bangalore (IN); Roy U. Rojas-Wahl, Teaneck, NJ (US)

(73) Assignee: Momentive Performance Material Inc., Waterford, NY (US)

(*) Notice: Subject to any disclaimer, the term of this patent is extended or adjusted under 35 U.S.C. 154(b) by 0 days.

(21) Appl. No.: 14/858,151

(22) Filed: Sep. 18, 2015

(65) Prior Publication Data

US 2016/0083527 A1    Mar. 24, 2016

Related U.S. Application Data

(60) Provisional application No. 62/052,058, filed on Sep. 18, 2014.

(51) Int. Cl.

| | | |
|---|---|---|
| *C08G 77/448* | (2006.01) | |
| *C08G 77/38* | (2006.01) | |
| *C08G 77/388* | (2006.01) | |
| *C08G 77/14* | (2006.01) | |
| *C08L 83/06* | (2006.01) | |
| *C08L 83/10* | (2006.01) | |
| *C08G 77/00* | (2006.01) | |

(52) U.S. Cl.
CPC ............ *C08G 77/448* (2013.01); *C08G 77/14* (2013.01); *C08G 77/38* (2013.01); *C08G 77/388* (2013.01); *C08G 77/80* (2013.01); *C08L 83/06* (2013.01); *C08L 83/10* (2013.01); *C08G 77/70* (2013.01)

(58) Field of Classification Search
None
See application file for complete search history.

(56) References Cited

U.S. PATENT DOCUMENTS

| | | | |
|---|---|---|---|
| 3,189,662 A | | 6/1965 | Vaughn, Jr. |
| 3,211,776 A | * | 10/1965 | Stephens ................. C07C 68/02 502/167 |
| 3,419,634 A | | 12/1968 | Vaughn, Jr. |
| 3,957,842 A | * | 5/1976 | Prokai ................ C08G 18/4072 521/111 |
| 4,123,436 A | * | 10/1978 | Holub ...................... C08K 5/10 524/289 |
| 4,123,588 A | | 10/1978 | Molari, Jr. |
| 4,569,970 A | | 2/1986 | Paul et al. |
| 4,746,701 A | * | 5/1988 | Kress ..................... C08L 51/04 264/331.13 |
| 4,920,183 A | | 4/1990 | Evans et al. |
| 5,068,302 A | | 11/1991 | Horlacher et al. |
| 5,114,861 A | * | 5/1992 | Silva .................... B01J 19/0006 436/171 |
| 5,767,219 A | * | 6/1998 | Takarada ............... C08G 77/46 528/15 |
| 5,869,727 A | * | 2/1999 | Crane .................... C08G 77/46 556/444 |
| 6,072,011 A | * | 6/2000 | Hoover ................. C08G 77/448 524/162 |
| 6,660,787 B2 | * | 12/2003 | Mahood ............... C08G 64/186 524/162 |
| 7,888,447 B2 | * | 2/2011 | Dhara .................. C08G 64/186 525/464 |
| 7,896,929 B2 | * | 3/2011 | Nguyen ................. C08G 77/46 8/115.51 |
| 8,222,350 B2 | * | 7/2012 | DeRudder ............... C08L 69/00 524/261 |
| 8,222,351 B2 | * | 7/2012 | DeRudder ............... C08L 69/00 524/261 |
| 8,450,412 B2 | * | 5/2013 | Elkovitch ............... C08L 77/00 524/430 |
| 8,481,640 B2 | * | 7/2013 | Gough ................... C08G 77/46 524/588 |
| 8,486,188 B2 | * | 7/2013 | Jaunky ................... C08G 77/46 106/287.14 |
| 8,722,837 B2 | * | 5/2014 | Carrillo .................. C08L 83/12 528/212 |

(Continued)

FOREIGN PATENT DOCUMENTS

| | | |
|---|---|---|
| EP | 1138714 A2 | 10/2001 |
| EP | 1167448 A2 | 1/2002 |
| WO | 2014191845 A2 | 12/2014 |

OTHER PUBLICATIONS

International Search Report and Written Opinion for PCT/US2015/050881, mailed Nov. 19, 2015, 11 pages.

*Primary Examiner* — Robert S Loewe
(74) *Attorney, Agent, or Firm* — Hoffman Warnick LLC

(57) ABSTRACT

Thermoplastic resin polymer compositions having a block of random polysiloxane co- or terpolymer structure, such as substituted phenyl-terminated polysiloxane co- or terpolymers having the general structure:

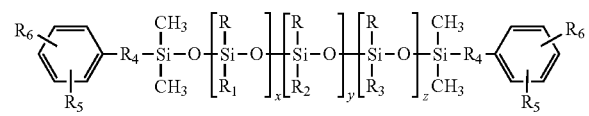

provide improved flame resistance, optical clarity, and better low-temperature impact strength compared to conventional blends, additives, and copolymers. The substituted phenyl terminated polysiloxanes may be used to make various polysiloxane-thermoplastic resin polymer and polymer blends, as well as articles including such polysiloxane-thermoplastic resin polymer and blends.

21 Claims, No Drawings

(56) References Cited

U.S. PATENT DOCUMENTS

| | | | | |
|---|---|---|---|---|
| 8,871,875 B2* | 10/2014 | Kim | ................... | C08G 64/186 525/464 |
| 2002/0061997 A1* | 5/2002 | Kanagawa | ........... | C08G 64/186 528/29 |
| 2006/0293535 A1* | 12/2006 | Davis | ..................... | C07C 68/02 558/282 |
| 2008/0029744 A1* | 2/2008 | Jansen | ................... | C08L 55/02 252/601 |
| 2012/0100474 A1* | 4/2012 | Hikosaka | ............... | C08G 64/10 430/69 |
| 2012/0101292 A1* | 4/2012 | Hikosaka | ............... | C07C 68/02 558/269 |
| 2013/0289193 A1* | 10/2013 | Ahn | ....................... | C08L 69/00 524/505 |

* cited by examiner

POLYSILOXANE CO- OR TERPOLYMERS AND POLYMERS MADE THEREFROM

FIELD OF INVENTION

The invention is directed to substituted phenyl-terminated polysiloxane co- or terpolymers and thermoplastic resin polymers made therefrom.

BACKGROUND OF INVENTION

Polycarbonate resins are well-known thermoplastic resins which have long been used in a variety of applications requiring resistance to impact. At low temperatures, generally lower than 20° C., polycarbonate becomes brittle and its utility is thus limited by this shortcoming. It is known that the low temperature impact strength of polycarbonate may be improved upon by the introduction of silicone blocks into the polycarbonate structure, as disclosed in U.S. Pat. Nos. 3,189,662; 3,419,634; 4,123,588; 4,569,970; 4,920,183 and 5,068,302.

The previous attempts to address low temperature impact strength, using additives, blends, and copolymer techniques, however, have not been successful in achieving low temperature impact strength while maintaining optical clarity.

Consequently, there is a need for new, cost effective materials that can provide improvements in low temperature impact strength while maintaining high optical clarity and that can therefore overcome the deficiencies of the conventional blends, additives, and copolymers.

SUMMARY

Accordingly, it has been found that thermoplastic resin polymer compositions having a block of random polysiloxane co- or terpolymer structure according to the present invention can provide improved flame resistance, optical clarity, and better low-temperature impact strength compared to conventional blends, additives, and copolymers. It has also been found that the inventive compositions reduce char formation on plastic surfaces (as measured using comparative tracking index (CTI)).

In an embodiment, a substituted phenyl-terminated polysiloxane co- or terpolymer is provided having the structural Formula (I):

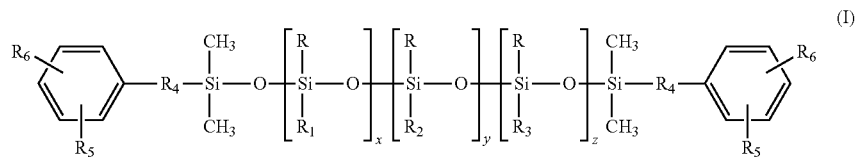

(I)

wherein R, $R_1$, $R_2$ and $R_3$ are independently a linear or branched aliphatic group containing from 1 to 20 carbon atoms, a substituted or unsubstituted aryl group containing 6 to 16 carbon atoms, an alicyclic group containing 3 to 16 carbon atoms, a heteronuclear aromatic group containing 3 to 16 carbon atoms, a hydrocarbyl group having from 3 to 16 carbon atoms and containing at least one heteroatom of oxygen, nitrogen or sulfur and/or containing at least one ester, nitrile or halo group, wherein $R_1$, $R_2$, and $R_3$ are not the same; $R_4$ is independently a divalent linear or branched alkylene group having from 1 to 10 carbon atoms, an aralkylene group having from 6 to 12 carbon atoms, an unsubstituted or substituted arylene group having from 6 to 18 carbon atoms, a hydrocarbylene group having from 2 to 10 carbon atoms and containing at least one heteroatom of oxygen or a covalent single bond; $R_5$ is independently a hydrogen, a halogen, an aliphatic group containing from 1 to 12 carbon atoms, an aromatic group containing from 6 to 12 carbon atoms, an alkoxy group containing from 1 to 12 carbon atoms or an aryloxy group containing from 6 to 12 carbon atoms; $R_6$ is independently a hydroxyl group, an amine group, a carboxylic acid chloride group or a sulfonyl halide group; x is from 1 to 300; y is from 1 to 100; z is from 0 to 50; more specifically x is from 1 to 275; y is from 1 to 70; z is from 1 to 30; and even more specifically x is from 1 to 250; y is from 1 to 40; and z is from 1 to 20.

In another embodiment, there is provided a polysiloxane-thermoplastic resin polymer comprising a random polysiloxane co- or terpolymer block derived from the substituted phenyl-terminated polysiloxane co- or terpolymer having the following structural Formula (I):

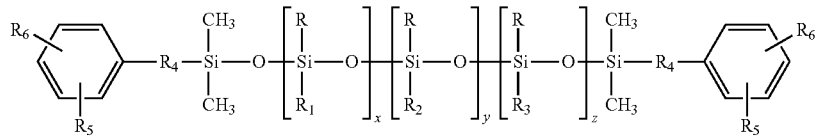

wherein R, $R_1$, $R_2$ and $R_3$ are independently a linear or branched aliphatic group containing from 1 to 20 carbon atoms, a substituted or unsubstituted aryl group containing 6 to 16 carbon atoms, an alicyclic group containing 3 to 16 carbon atoms, a heteronuclear aromatic group containing 3 to 16 carbon atoms, a hydrocarbyl group having from 3 to 16 carbon atoms and containing at least one heteroatom of oxygen, nitrogen or sulfur and/or containing at least one ester, nitrile or halo group, wherein $R_1$, $R_2$, and $R_3$ are not the same; $R_4$ is independently a divalent linear or branched alkylene group having from 1 to 10 carbon atoms, an aralkylene group having from 6 to 12 carbon atoms, an unsubstituted or substituted arylene group having from 6 to 18 carbon atoms, hydrocarbylene group having from 2 to 10 carbon atoms and containing at least one heteroatom of oxygen or a covalent single bond; $R_5$ is independently a hydrogen, a halogen, an aliphatic group containing from 1 to 12 carbon atoms, an aromatic group containing from 6 to carbon atoms, an alkoxy group containing form 1 to 12 carbon atoms or an aryloxy group containing from 6 to 12 carbon atoms; $R_6$ is independently a hydroxyl group, an amine group, a carboxylic acid chloride group or a sulfonyl halide group; x is from 1 to 300; y is from 1 to 100; z is from 0 to 50; more specifically x is from 1 to 275; y is from 1 to 70; z is from 1 to 30; and even more specifically x is from 1 to 250; y is from 1 to 40; and z is from 1 to 20. In an embodiment, the block of the random polysiloxane co- or terpolymer is bonded to the thermoplastic resin polymer through a —O—, —NR—, —C(=O)O— or —S(=O)O— linking group. More specifically, the thermoplastic resin is selected from the group consisting of polycarbonate homopolymer, a polycarbonate copolymer, a polycarbonate-polyester, a polyester, polysulfones, polyethersulfones, polyetheretherketones, polyimides, and polyetherimides or combinations thereof to form a polysiloxane-thermoplastic resin polymer. Even more specifically, the thermoplastic resin is polycarbonate polymer, such as a polycarbonate homopolymer or a polycarbonate copolymer.

In yet another embodiment, there is provided a method of preparing a polysiloxane-polycarbonate polymer which comprises polymerizing a substituted phenyl-terminated polysiloxane co- or terpolymer derived from a compound represented by the structural Formula (I):

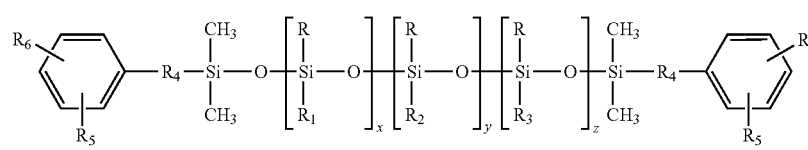

wherein R, $R_1$, $R_2$ and $R_3$ are independently a linear or branched aliphatic group containing from 1 to 20 carbon atoms, a substituted or unsubstituted aryl group containing 6 to 16 carbon atoms, an alicyclic group containing 3 to 16 carbon atoms, a heteronuclear aromatic group containing 3 to 16 carbon atoms, a hydrocarbyl group having from 3 to 16 carbon atoms and containing at least one heteroatom of oxygen, nitrogen or sulfur or containing at least one ester, nitrile or halo group, wherein $R_1$, $R_2$, and $R_3$ are not the same; $R_4$ is independently a divalent linear or branched alkylene group having from 1 to 10 carbon atoms, an aralkylene group having from 6 to 12 carbon atoms, an unsubstituted or substituted arylene group having from 6 to 18 carbon atoms, hydrocarbylene group having from 2 to 10 carbon atoms and containing at least one heteroatom of oxygen or a covalent single bond; $R_5$ is independently a hydrogen, a halogen, an aliphatic group containing from 1 to 12 carbon atoms, an aromatic group containing from 6 to 12 carbon atoms, an alkoxy group containing form 1 to 12 carbon atoms or an aryloxy group containing from 6 to 12 carbon atoms; $R_6$ is independently a hydroxyl group, an amine group, a carboxylic acid chloride group or a sulfonyl halide group; x is from 1 to 300; y is from 1 to 100; z is from 0 to 50; more specifically x is from 1 to 275; y is from 1 to 70; z is from 1 to 30; and even more specifically x is from 1 to 250; y is from 1 to 40; and z is from 1 to 20 with activated carbonyl compounds. The substituted phenyl-terminated polysiloxane co- or terpolymer is polymerized with an activated carbonyl such as, but not limited to, phosgene or diphenyl carbonate, in the presence of a compound represented by the structural Formula (II):

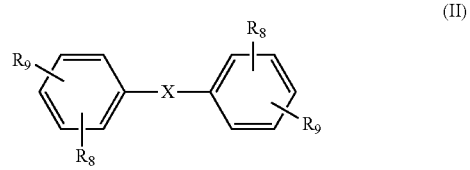

where $R_8$ is independently a hydrogen, a halogen, an aliphatic group having from 1 to 6 carbon atoms, an aromatic group having 6 to 8 carbon atoms, an alkoxy group having from 1 to 6 carbon atoms, or an aryloxy group; and $R_9$ is independently a hydroxyl group, an amine group, an acid chloride group, or a sulfonyl halide group; and X is selected from the group consisting of:

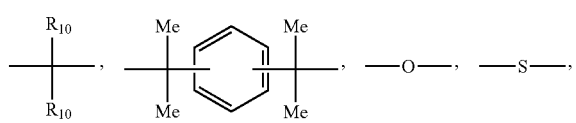

-continued

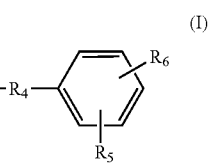

wherein $R_{10}$, $R_{11}$ are independently a hydrogen, halogen, an alkyl group having from 1 to 18 carbon atoms, an aryl group having from 3 to 14 carbon atoms, an aryloxy group having from 6 to 10 carbon atoms, an aralkyl group having from 7 to 20 carbon atoms, an alkoxy group having from 1 to 10 carbon atoms, a cycloalkyl group having from 6 to 20 carbon atoms, a cycloalkoxy group having from 6 to 20 carbon atoms, an alkenyl group having from 2 to 10 carbon atoms, an aralkyloxy group, a nitro group, an aldehyde group, a cyano group, or a carboxyl group, to provide the polysiloxane-polycarbonate polymer.

DESCRIPTION OF THE EMBODIMENTS

The present invention relates to a substituted phenyl terminated-polysiloxane co- or terpolymer and polysiloxane-thermoplastic resin polymer prepared therefrom. These polysiloxane-thermoplastic resin polymers exhibit advantageous properties such as improved low temperature impact properties, improved rheological properties during molding, improved optical clarity, chemical resistance, scratch resistance, improved heat aging properties and improved electrical insulation properties. Further advantages include improvements to thermal stability, comparative tracking index, flame resistant behavior, refractive index values, adhesion, higher heat distortion index, lower glass transition ($T_g$) temperature, and the melt flow index.

The present invention herein is directed to a substituted phenyl-terminated polysiloxane co- or terpolymer having the structural Formula I:

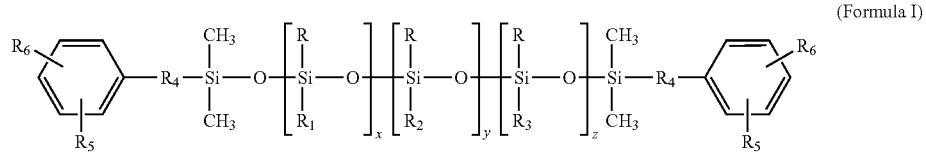

(Formula I)

wherein R, $R_1$, $R_2$ and $R_3$ are independently a linear or branched aliphatic group containing from 1 to 20 carbon atoms, a substituted or unsubstituted aryl group containing 6 to 16 carbon atoms, an alicyclic group containing 3 to 16 carbon atoms, a heteronuclear aromatic group containing 3 to 16 carbon atoms, a hydrocarbyl group having from 3 to 16 carbon atoms and containing at least one heteroatom of oxygen, nitrogen or sulfur and/or containing at least one ester, nitrile or halo group, $R_1$, $R_2$, and $R_3$ are not the same; $R_4$ is independently a divalent linear or branched alkylene group having from 1 to 10 carbon atoms, an aralkylene group having from 6 to 12 carbon atoms, an unsubstituted or substituted arylene group having from 6 to 18 carbon atoms, hydrocarbylene group having from 2 to 10 carbon atoms and containing at least one heteroatom of oxygen or a covalent single bond; $R_5$ is independently a hydrogen, a halogen, an aliphatic group containing from 1 to 12 carbon atoms, an aromatic group containing from 6 to 12 carbon atoms, an alkoxy group containing form 1 to 12 carbon atoms or an aryloxy group containing from 6 to 12 carbon atoms; $R_6$ is independently a hydroxyl group, an amine group, a carboxylic acid chloride group or a sulfonyl halide group; x is an integer from 1 to 300; y is an integer from 1 to 100; z is an integer from 0 to 50; more specifically x is an integer from 1 to 275; y is an integer from 1 to 70; z is an integer from 1 to 30; and even more specifically x is an integer from 1 to 250; y is an integer from 1 to 40; and z is an integer from 1 to 20.

In one embodiment, the substituted phenyl-terminated polysiloxane co- or terpolymer is added to a thermoplastic resin to form a polymer blend containing the substituted phenyl-terminated polysiloxane co- or terpolymer. Representative and non-limiting examples of thermoplastic resins may be selected from polycarbonate homopolymers, a polycarbonate copolymers, a polycarbonate-polyesters, polyesters, polysulfones, polyethersulfones, polyetheretherketones, polyimides, and polyetherimides or combinations thereof to form a polysiloxane-thermoplastic resin polymer blend (composition).

In an embodiment, the substituted phenyl-terminated polysiloxane co- or terpolymer of Formula (I), R is methyl or phenyl, more specifically methyl; $R_1$ is methyl or phenyl, more specifically methyl; $R_2$ and $R_3$ are independently selected from the group consisting of a linear alkyl chain of 4 to 15 carbon atoms, 2,2-diphenylethyl, carbazol-9-yl-ethyl, 4-phenyl-3-oxa-butyl, chloromethylphenylethyl, methacryloxypropyl, acryloxypropyl, 2,2-diphenylethyl, benzocyclobutenylethyl, 4-phenyl-3-thia-butyl, 3-benzoyloxypropyl, 2-benzoyloxyethyl or chlorophenylethyl, with the proviso that $R_2$ and $R_3$ are different; $R_4$ is methylene, ethylene, propylene or isobutylene; $R_5$ is hydrogen, methoxy, ethoxy, propoxy, chloro, methyl, ethyl or propyl; $R_6$ is hydroxyl, and x, y and z are integers where x is from 1 to 300; y is from 1 to 100; z is from 0 to 50; more specifically x is from 5 to 100; y is from 2 to 20 and z is from 2 to 30.

In another embodiment, the substituted phenyl-terminated polysiloxane co- or terpolymer of Formula (I), R is methyl; $R_1$ is methyl; $R_2$ is a linear alkyl chain of 4 to 15 carbon atoms, 2,2-diphenylethyl, carbazol-9-yl-ethyl, chloromethylphenylethyl or chlorophenylethyl; $R_3$ is 4-phenyl-3-oxa-butyl, 4-phenyl-3-oxa-2-methylbutyl, 3-benzoyloxypropyl, 2-benzoyloxyethyl; $R_4$ is methylene, ethylene, propylene, isopropylene or isobutylene; $R_5$ is hydrogen, methoxy, chloro or methyl; $R_6$ is hydroxyl, and x, y and z are integers where x is from 10 to 75; y is from 2 to 20; z is from 0 to 20, or more specifically z is from 2 to 20.

In another embodiment, a method of preparing a substituted phenyl-terminated polysiloxane co- or terpolymers is provided. The method comprises providing a hydride terminated polysiloxane from cyclic oligomers, e.g. a cyclic siloxane. In an embodiment, the hydride terminated polysiloxanes can be obtained through ring opening polymerization of a cyclic siloxane with disiloxane hydride in the presence of an acidic and/or a basic catalyst. The hydride terminated polysiloxane has the structure represented by the structural Formula (III):

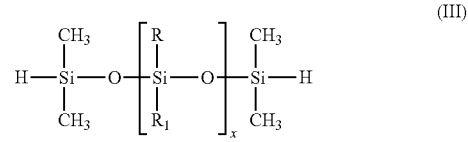

(III)

wherein R and $R_1$ are independently a linear or branched aliphatic group containing from 1 to 20 carbon atoms, a substituted or unsubstituted aryl group containing 6 to 16 carbon atoms, an alicyclic group containing 3 to 16 carbon atoms, a heteronuclear aromatic group containing 3 to 16 carbon atoms, a hydrocarbyl group having from 3 to 16 carbon atoms and containing at least one heteroatom of oxygen, nitrogen or sulfur and/or containing at least one ester, nitrile or halo group; wherein x is from 1 to 300. The hydride terminated polysiloxane of Formula (III) is then hydrosilylated with a substituted phenyl compound having and carbon-carbon double bond and at least one functional group selected from the group consisting of hydroxyl group, an amine group, a carboxylic acid chloride group and a sulfonyl halide group to obtain a substituted phenylalkyl-terminated polysiloxane. The substituted phenylalkyl-terminated polysiloxane is then equilibrated with a hydride substituted polysiloxane and/or cyclic siloxane. The reaction product of the equilibration reaction is a substituted phenylalkyl-terminated polysiloxane containing at least one Si—H (silicon hydride) group and is represented by the structural Formula (IV):

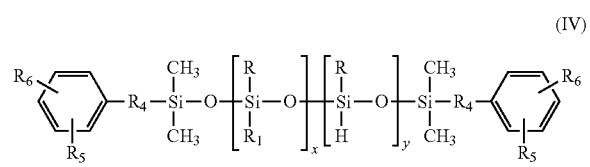

(IV)

wherein R and R$^1$ are independently a linear or branched aliphatic group containing from 1 to 20 carbon atoms, a substituted or unsubstituted aryl group containing 6 to 16 carbon atoms, an alicyclic group containing 3 to 16 carbon atoms, a heteronuclear aromatic group containing 3 to 16 carbon atoms, a hydrocarbyl group having from 3 to 16 carbon atoms and containing at least one heteroatom of oxygen, nitrogen or sulfur and/or containing at least one ester, nitrile or halo group; $R_4$ is independently a divalent linear or branched alkylene group having from 1 to 10 carbon atoms, an aralkylene group having from 6 to 12 carbon atoms, an unsubstituted or substituted arylene group having from 6 to 18 carbon atoms, hydrocarbylene group having from 2 to 10 carbon atoms and containing at least one heteroatom of oxygen to form an ether or a covalent single bond; $R_5$ is independently a hydrogen, a halogen, an aliphatic group containing from 1 to 12 carbon atoms, an aromatic group containing from 6 to 12 carbon atoms, an alkoxy group containing form 1 to 12 carbon atoms or an aryloxy group containing from 6 to 12 carbon atoms; $R_6$ is independently a hydroxyl group, an amine group, a carboxylic acid chloride group or a sulfonyl halide group; x is from 1 to 300; y is from 1 to 100. The substituted phenylalkyl-terminated polysiloxane containing at least one Si—H (silicon hydride) group is next hydrosilylated with a compound containing a carbon-carbon double bond and a linear or branched aliphatic group containing from 1 to 18 carbon atoms, a substituted or unsubstituted aryl group containing 6 to 14 carbon atoms, an alicyclic group containing 3 to 14 carbon atoms, a heteronuclear aromatic group containing 3 to 14 carbon atoms, a hydrocarbyl group having from 3 to 14 carbon atoms and containing at least one heteroatom of oxygen, nitrogen or sulfur and/or containing at least one ester, nitrile or halo group to obtain a substituted phenylalkyl-terminated polysiloxane copolymer of structural Formula (V):

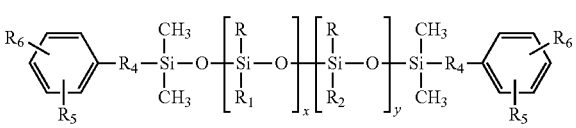

(V)

wherein R and $R_1$ are independently an aliphatic group containing from 1 to 20 carbon atoms, a substituted or unsubstituted aryl group containing 6 to 16 carbon atoms, an alicyclic group containing 3 to 16 carbon atoms, a heteronuclear aromatic group containing 3 to 16 carbon atoms, a hydrocarbyl group having from 3 to 16 carbon atoms and containing at least one heteroatom of oxygen, nitrogen or sulfur and/or containing at least one ester, nitrile or halo group; $R_2$ is aliphatic group containing from 2 to 20 carbon atoms, a substituted or unsubstituted aryl group containing 8 to 16 carbon atoms, an alicyclic group containing 5 to 16 carbon atoms, a heteronuclear aromatic group containing 5 to 16 carbon atoms, a hydrocarbyl group having from 5 to 16 carbon atoms and containing at least one heteroatom of oxygen, nitrogen or sulfur and/or containing at least one ester, nitrile or halo group. $R_1$ and $R_2$ are not the same; $R_4$ is independently a divalent linear or branched alkylene group having from 1 to 10 carbon atoms, an aralkylene group having from 6 to 12 carbon atoms, an unsubstituted or substituted arylene group having from 6 to 18 carbon atoms, hydrocarbylene group having from 2 to 10 carbon atoms and containing at least one heteroatom of oxygen or a covalent single bond; $R_5$ is independently a hydrogen, a halogen, an aliphatic group containing from 1 to 12 carbon atoms, an aromatic group containing from 6 to 12 carbon atoms, an alkoxy group containing form 1 to 12 carbon atoms or an aryloxy group containing from 6 to 12 carbon atoms; $R_6$ is independently a hydroxyl group, an amine group, a carboxylic acid chloride group or a sulfonyl halide group; x is from 1 to 300; y is from 1 to 100, more specifically x is from 1 to 275 and y is from 1 to 75; and even more specifically, x is from 1 to 250; and y is 1 to 40. The substituted phenylalkyl-terminated polysiloxane copolymer of Formula (V) is then equilibrated with a hydride substituted polysiloxane and/or cyclic siloxane. The reaction product of the equilibration reaction is a substituted phenylalkyl-terminated polysiloxane terpolymer containing at least one Si—H (silicon hydride) group and is represented by the structural Formula (VI):

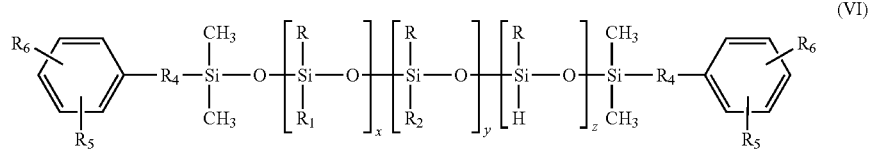

(VI)

wherein R and $R_1$ are independently an aliphatic group containing from 1 to 20 carbon atoms, a substituted or unsubstituted aryl group containing 6 to 16 carbon atoms, an alicyclic group containing 3 to 16 carbon atoms, a heteronuclear aromatic group containing 3 to 16 carbon atoms, a hydrocarbyl group having from 3 to 16 carbon atoms and containing at least one heteroatom of oxygen, nitrogen or sulfur and/or containing at least one ester, nitrile or halo group; $R_2$ is aliphatic group containing from 2 to 20 carbon atoms, a substituted or unsubstituted aryl group containing 8 to 16 carbon atoms, an alicyclic group containing 5 to 16 carbon atoms, a heteronuclear aromatic group containing 5 to 16 carbon atoms, a hydrocarbyl group having from 5 to 16 carbon atoms and containing at least one heteroatom of oxygen, nitrogen or sulfur and/or containing at least one ester, nitrile or halo group. $R_1$ and $R_2$ are not the same; $R_4$ is independently a divalent linear or branched alkylene group having from 1 to 10 carbon atoms, an aralkylene group having from 6 to 12 carbon atoms, an unsubstituted or substituted arylene group having from 6 to 18 carbon atoms, hydrocarbylene group having from 2 to 10 carbon atoms and containing at least one heteroatom of oxygen or a covalent single bond; $R_5$ is independently a hydrogen, a halogen, an aliphatic group containing from 1 to 12 carbon atoms, an aromatic group containing from 6 to 12 carbon atoms, an alkoxy group containing form 1 to 12 carbon atoms or an aryloxy group containing from 6 to 12 carbon atoms; $R_6$ is independently a hydroxyl group, an amine group, a carboxylic acid chloride group or a sulfonyl halide group; x is from 1 to 300; y is from 1 to 100 and z is 1 to 50. The substituted phenylalkyl-terminated polysiloxane terpolymer containing at least one Si—H (silicon hydride) group and represented by the structural Formula (VI) is then hydrosilylated with a compound containing a carbon-carbon double bond and a linear or branched aliphatic group containing from 1 to 18 carbon atoms, a substituted or unsubstituted aryl group containing 6 to 14 carbon atoms, an alicyclic group containing 3 to 14 carbon atoms, a heteronuclear aromatic group containing 3 to 14 carbon atoms, a hydrocarbyl group having from 3 to 14 carbon atoms and containing at least one heteroatom of oxygen, nitrogen or sulfur and/or containing at least one ester, nitrile or halo group to obtain a substituted phenylalkyl-terminated polysiloxane terpolymer of the structural Formula (VII):

wherein R and $R_1$ are independently a linear or branched aliphatic group containing from 1 to 20 carbon atoms, a substituted or unsubstituted aryl group containing 6 to 16 carbon atoms, an alicyclic group containing 3 to 16 carbon atoms, a heteronuclear aromatic group containing 3 to 16 carbon atoms, a hydrocarbyl group having from 3 to 16 carbon atoms and containing at least one heteroatom of oxygen, nitrogen and/or sulfur or containing at least one ester, nitrile or halo group; $R_2$ and $R_3$ are independently a linear or branched aliphatic group containing from 2 to 20 carbon atoms, a substituted or unsubstituted aryl group containing 8 to 16 carbon atoms, an alicyclic group containing 5 to 16 carbon atoms, a heteronuclear aromatic group containing 5 to 16 carbon atoms, a hydrocarbyl group having from 5 to 16 carbon atoms and containing at least one heteroatom of oxygen, nitrogen or sulfur and/or containing at least one ester, nitrile or halo group, wherein $R_1$, $R_2$, and $R_3$ are not the same; $R_4$ is independently a divalent linear or branched alkylene group having from 1 to 10 carbon atoms, an aralkylene group having from 6 to 12 carbon atoms, an unsubstituted or substituted arylene group having from 6 to 18 carbon atoms, hydrocarbylene group having from 2 to 10 carbon atoms and containing at least one heteroatom of oxygen or a covalent single bond; $R_5$ is independently a hydrogen, a halogen, an aliphatic group containing from 1 to 12 carbon atoms, an aromatic group containing from 6 to 12 carbon atoms, an alkoxy group containing form 1 to 12 carbon atoms or an aryloxy group containing from 6 to 12 carbon atoms; $R_6$ is independently a hydroxyl group, an amine group, a carboxylic acid chloride group or a sulfonyl halide group; x is from 1 to 300; y is from 1 to 100; z is from 1 to 50; more specifically x is from 1 to 275; y is from 1 to 70; z is from 1 to 30; and even more specifically x is from 1 to 250; y is from 1 to 40; and z is from 1 to 20. The substituted phenylalkyl-terminated polysiloxane copolymer of Formula (V) or the substituted phenylalkyl-terminated polysiloxane of Formula (VII) may optionally be further purified to remove organics. The purification is conducted at a reduced pressure at a temperature of about 150 to about 300° C. to obtain substituted phenylalkyl-terminated polysiloxane co- or terpolymers.

In an embodiment, there is provided a siloxane-thermoplastic resin polymer comprising a random polysiloxane co- or terpolymer block derived from the substituted phenyl-terminated polysiloxane co- or terpolymer having the following structural Formula (I):

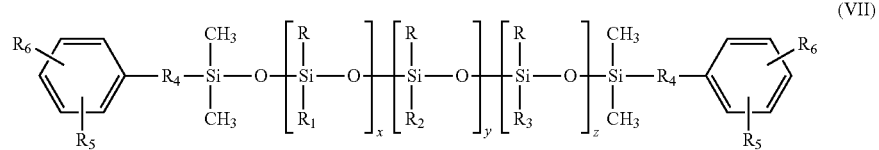
(VII)

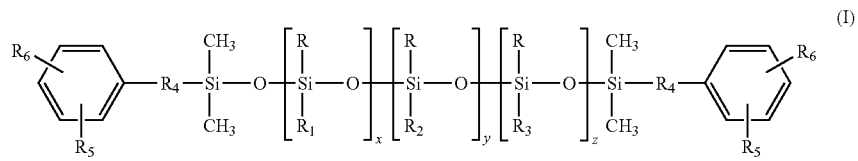

wherein R, $R_1$, $R_2$ and $R_3$ are independently a linear or branched aliphatic group containing from 1 to 20 carbon atoms, a substituted or unsubstituted aryl group containing 6 to 16 carbon atoms, an alicyclic group containing 3 to 16 carbon atoms, a heteronuclear aromatic group containing 3 to 16 carbon atoms, a hydrocarbyl group having from 3 to 16 carbon atoms and containing at least one heteroatom of oxygen, nitrogen or sulfur and/or containing at least one ester, nitrile or halo group, wherein $R_1$, $R_2$, and $R_3$ are not the same; $R_4$ is independently a divalent linear or branched alkylene group having from 1 to 10 carbon atoms, an aralkylene group having from 6 to 12 carbon atoms, an unsubstituted or substituted arylene group having from 6 to 18 carbon atoms, hydrocarbylene group having from 2 to 10 carbon atoms and containing at least one heteroatom of oxygen or a covalent single bond; $R_5$ is independently a hydrogen, a halogen, an aliphatic group containing from 1 to 12 carbon atoms, an aromatic group containing from 6 to 12 carbon atoms, an alkoxy group containing form 1 to 12 carbon atoms or an aryloxy group containing from 6 to 12 carbon atoms; $R_6$ is independently a hydroxyl group, an amine group, a carboxylic acid chloride group or a sulfonyl halide group; x is from 1 to 300; y is from 1 to 100; z is from 0 to 50; more specifically x is from 1 to 275; y is from 1 to 70; z is from 1 to 30; and even more specifically x is from 1 to 250; y is from 1 to 40; and z is from 1 to 20.

In another embodiment, substituted phenyl-terminated polysiloxane co- or terpolymers of Formula (I) may be combined with a polycarbonate homopolymer, a polycarbonate copolymer, a polycarbonate-polyester, a polyester, polysulfones, polyethersulfones, polyetheretherketones, polyimides, and polyetherimides or combinations thereof to form a polysiloxane-thermoplastic resin polymer or polymer blend.

In still another embodiment, polysiloxane-thermoplastic resin polymers are provided wherein said polymers are derived from substituted phenyl-terminated polysiloxane co- or terpolymer of Formula I and having the structural the units of Formula (VIII):

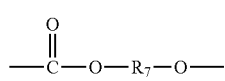

(VIII)

wherein each $R_7$ is independently a hydrocarbon group containing from 1 to 60 carbon atoms, a divalent hydrocarbon group, or a group derived from the structural unit referred to as structural Formula (II):

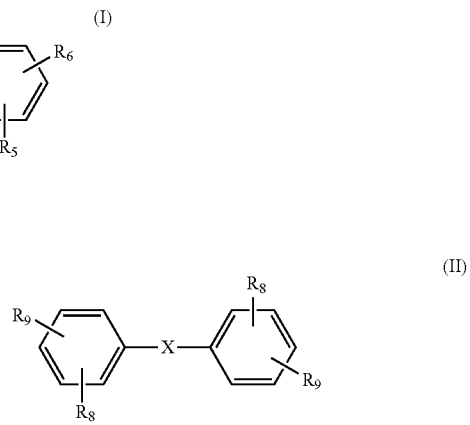

where $R_8$ is independently a hydrogen, a halogen, an aliphatic group having from 1 to 6 carbon atoms, an aromatic group having 6 to 8 carbon atoms, an alkoxy group having from 1 to 6 carbon atoms, or an aryloxy group; and $R_9$ is independently a hydroxyl group, an amine group, an acid chloride group, or a sulfonyl halide group; and X is selected from the group consisting of:

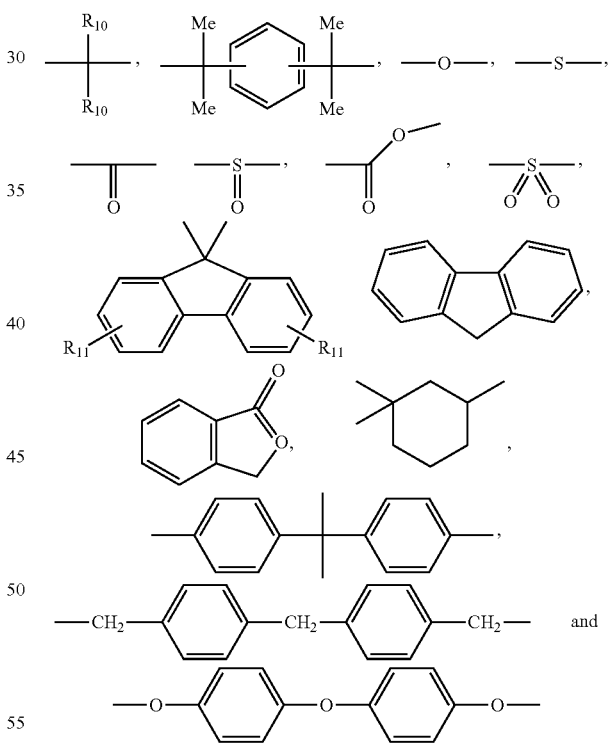

wherein $R_{10}$ and $R_{11}$ are independently a hydrogen, a halogen, an alkyl group having from 1 to 18 carbon atoms, an aryl group having from 3 to 14 carbon atoms, an aryloxy group having from 6 to 10 carbon atoms, an aralkyl group having from 7 to 20 carbon atoms, an alkoxy group having from 1 to 10 carbon atoms, a cycloalkyl group having from 6 to 20 carbon atoms, a cycloalkoxy group having from 6 to 20 carbon atoms, an alkenyl group having from 2 to 10 carbon atoms, an aralkyloxy group, a nitro group, an aldehyde group, a cyano group, or a carboxyl group.

In embodiments of the polysiloxane-thermoplastic resin polymer disclosed above, representative and non-limiting examples of $R_3$ are a linear alkyl chain of 4 to 15 carbon atoms, substituted or unsubstituted aromatic group, and groups obtained from vinyl carbazole, allylphenylether, vinylbenzyl chloride, allylmethacrylate, diphenylethylene, vinylbenzocyclobutene, allylphenylsulfide, vinylbenzoate, chlorostyrene.

In embodiments of the polysiloxane-thermoplastic resin polymer disclosed above, $R_9$ is a hydroxy group and $R_{10}$ is an alkyl group of from 1 to 6 carbon atoms.

The polysiloxane-thermoplastic resin polymer of the present invention may be prepared by polymerizing a dihydroxy aromatic compound with a substituted phenyl-terminated polysiloxane co- or terpolymer of Formula (I) in the presence of a carbonate precursor, such as phosgene. In one embodiment, the dihydroxy aromatic compound is bisphenol A, and the substituted phenyl-terminated polysiloxane co- or terpolymer of Formula I.

In embodiments of the method of preparing the polysiloxane-thermoplastic resin polymer disclosed herein, the carbonate precursor is selected from phosgene, diphosgene, triphosgene and diarylcarbonates, bis(methylsalicyl)carbonate, or combinations thereof.

In embodiments, the polymerization reaction is an interfacial polymerization process conducted in the presence of a solvent and optionally one or more catalysts.

In embodiments, the polymerization reaction is an interfacial polymerization process conducted in the presence of a solvent that includes chlorinated aliphatic organic liquid, methylene chloride, chloroform, carbon tetrachloride, 1,2-dichloroethane, trichloroethane, tetrachloroethane, dichloropropane, 1,2-dichloroethylene, chlorobenzene, dichlorobenzene, chlorine-containing aromatic solvents, toluene, various chlorotoluenes and the like, aqueous solvents such as de-ionized water and optionally one or more catalysts.

In embodiments, the polymerization reaction is an interfacial polymerization process conducted in the presence of a solvent, a caustic, and optionally one or more catalysts, and wherein the carbonate precursor is phosgene, diphosgene, triphosgene and diarylcarbonates, bis(methylsalicyl) carbonate, or a combination thereof, suitable catalysts for the interfacial polymerization reaction includes aliphatic amines such as tertiary amine catalysts, trialkylamine; phase transfer catalyst such as catalysts of the formula $(X_3)_4L^+Y^-$, wherein each $X_3$ is independently a alkyl group containing from 1 to 25 carbon atoms; L is a nitrogen or phosphorus atom; and Y is a halogen atom or an alkoxide group containing from 1 to 8 carbon atoms or an aryloxide group containing from 6 to 18 carbon atoms. Combinations of such catalysts may also be used.

In embodiments, the polymerization reaction is performed by reacting bisphenol A with triphosgene in a biphasic solvent in the presence of a phase transfer catalyst to form a bischloroformate; and adding the substituted phenyl-terminated polysiloxane co- or terpolymer to form the polysiloxane-thermoplastic resin polymer. In embodiments, chloroformates of dihydroxyphenylalkyl-terminated polysiloxane co- or terpolymers are formed in a tube reactor, and then added into an interfacial polycondensation reactor with a catalyst.

A variety of articles of manufacture can be made using the polysiloxane-thermoplastic resins polymers of the invention, and particularly using polymer blend compositions containing the substituted phenylalkyl-terminated polysiloxane co- or terpolymers and/or polysiloxane-thermoplastic resins polymers of the invention (for example, in combination with a polycarbonate homopolymer).

In an embodiment, the polymer blend composition comprises polysiloxane-thermoplastic resins polymers of from about 0.01 weight percent to about 25 weight percent, preferably about 0.01 weight percent to about 10 weight percent and more preferably about 0.01 weight percent to about 7 weight percent, based on the weight of the total weight of the polysiloxane-thermoplastic resin polymer and thermoplastic resin polymer.

Non-limiting and representative of articles that my include the polysiloxane-thermoplastic resins polymers of the invention include, but are not limited to, mobile phone housings, frozen food service equipment, personal safety applications including helmets, automotive and motorcycle windshields, automotive sunroofs, other automotive applications including dashboards allowing for robust airbag deployment without fragmenting, and automotive headlamp or electronics screen applications, where clarity, flame retardance, and impact resistance are beneficial.

Specific embodiments will now be described in detail. These examples are intended to be illustrative, and not limited to the materials, conditions, or process parameters set forth in these embodiments. All parts are percentages by solid weight unless otherwise indicated.

EXAMPLES

Comparative Example A

Synthesis of Eugenol end-capped polysiloxane fluid ($^{Eu}MD_{45}M^{Eu}$)

A 1 L reaction flask was charged with octamethylcyclotetrasiloxane ($D_4$, 500 grams), tetramethyldisiloxane (M'M', 40 grams) and Ion Exchange Resin (15 grams), was stirred under $N_2$, and was heated to 50° C. until the reaction reached equilibrium. The reaction mixture was allowed to cool and subsequently was filtered.

A reaction flask was then charged with the reaction product from above (M'D$_{45}$M', 500 grams) and a platinum catalyst (0.2 total weight percent), stirred under $N_2$, and heated to 80° C. Eugenol (30 grams) was charged to an addition funnel and added drop-wise at a rate to maintain a reaction temperature of 100° C. Following the addition, the reaction was heated to 120° C. for 2 hours. The reaction mixture was allowed to cool, treated with Celite and filtered.

Example 1

Synthesis of (4-hydroxy-3-methoxyphenyl)propyl-terminated polysiloxane terpolymer, $^{Eu}MD_xD_y^{Me,}$ $_{DPE}D_z^{Me,APE}M^{Eu}$ The synthesis of (4-hydroxy-3-methoxyphenyl)propyl-terminated polysiloxane terpolymer having the average chemical formula:

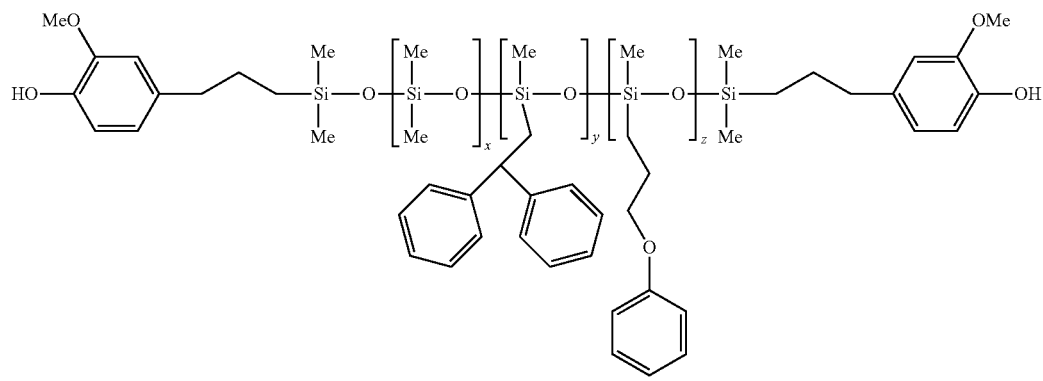

was carried out in a stepwise manner.

Into a round bottom flashed was charged 200 g of a fluid of the formula $^{Eu}MD_{45}M^{Eu}$ prepared according to the intermediate Comparative Example A, 60 grams of 1,3,5,7-tetramethylcyclotetrasiloxane (TMCTS), and concentrated $H_2SO_4$ as a catalyst. The reaction mixture was heated to 70° C. and stirred under $N_2$ for 16 to 24 hours to equilibrate the mixture. Thereafter, the reaction mixture was neutralized and filtered through diatomaceous earth (Celite™). The low boiling components of the filtrate were removed heating the filtrated to 150° C. under reduced pressure of 5 mbar to produce a colorless viscous fluid of the average structure $^{Eu}MD_{45}D_{20}{}^{H,Me}M^{Eu}$.

As used herein and elsewhere in this document, $^{Eu}M$ represents a monofunctional siloxane unit having the structure

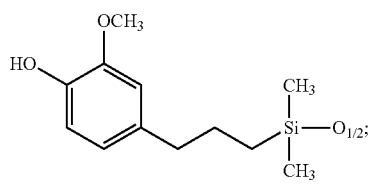

D represents a difunctional siloxane unit having the structure $(CH_3)_2SiO_{2/2}$; and
$D^{H,Me}$ represents a difunctional siloxane unit having the structure $CH_3SiHO_{2/2}$.

Following this, a 250 ml round bottom flask was charged with 90 grams of $^{Eu}MD_{45}D_y{}^{H,Me}M^{Eu}$ and heated. A stoichiometric amount of a mixture of diphenylethylene and allylphenylether in a molar ratio of 2:3 along with 0.07 grams of Speier's catalyst ($H_2PtCl_6$) was added. The reaction mixture was maintained at 120° C. for 10 hours. Thereafter, the reaction mixture was cooled and filtered through diatomaceous earth. The residual materials were removed under reduced pressure of 5 mbar and elevated temperature of 150° C. to produce a colorless very viscous fluid having the average structure, $^{Eu}MP_{45}D_8{}^{Me,DPE}D_{12}{}^{Me,APE}M^{Eu}$. As used herein and elsewhere in this document, $D^{Me,DPE}$ represents the structural unit:

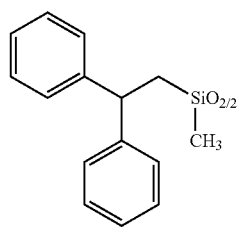

and $D^{Me,APE}$ represents the structural unit:

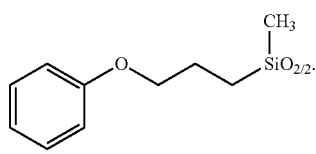

The refractive index of resulting material was measured to be 1.4832. Table 1 illustrates further measurements of the produced material form Examples 1 and 2.

TABLE 1

| | | | | Characteristics of reactive polysiloxane | | | | | |
|---|---|---|---|---|---|---|---|---|---|
| Reactions | $R_1$ | $R_2$ | $R_3$ | D-units (x, y, z) | MW | PDI | $T_d$ (° C.) | $T_g$ (° C.) | RI |
| Example 1 | Me/Me | Me/DPE | Me/APE | x = 45, y = 8, z = 12 | 14,299 | >2.0 | 472 | −57 | 1.4832 |
| Comparative Example A | Me/Me | — | — | x = 45, y = 0, z = 0 | 5,700 | 1.32 | 448 | −118 | 1.4210 |

Me: Methyl;
DPE: diphenylethylene;
APE: propylenephenylether

Example 2

Synthesis of (4-hydroxy-3-methoxyphenyl)propyl-terminated polysiloxane terpolymer, $^{Eu}MD_{45}D_9{}^{Me,}{}_{EC}D_{11}{}^{Me,APE}M_{Eu}$ The synthesis of (4-hydroxy-3-methoxyphenyl)propylene-terminated polysiloxane terpolymer having the average chemical formula:

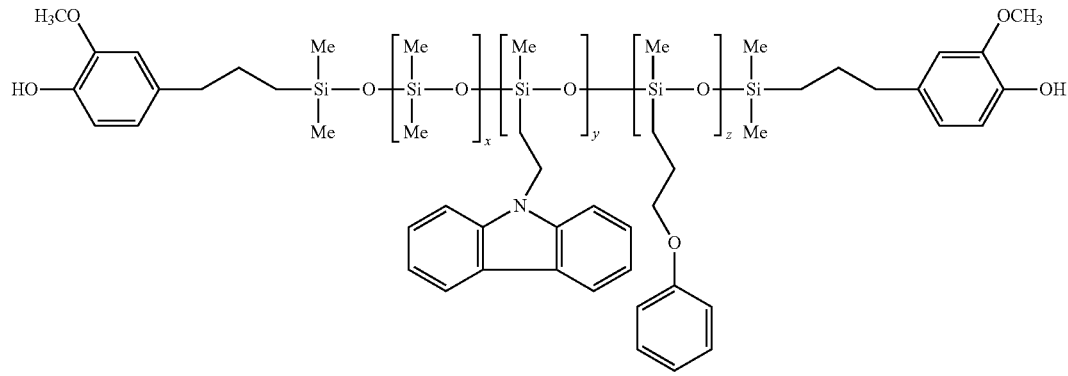

where x=45, y=9 and z=11 is provided. As used herein, $D^{Me,EC}$ represents the structural unit:

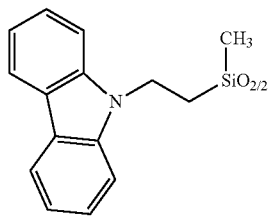

A 250 ml round bottom flask was charged with 100 grams of $^{Eu}MD_{45}D_{20}{}^{H,Me}M^{Eu}$ prepared according to the procedure of Comparative Example A was heated and a stoichiometric amount of a mixture of vinyl carbazole and allyl phenyl ether where the molar ratio of vinyl carbazole and allyl phenyl ether was 9:11 and 0.85 grams of a Speier's catalyst (H₂PtCl₆) was maintained at 120° C. for 10 hours. Thereafter, the reaction mixture was cooled and filtered through diatomaceous earth. The residual materials were removed under reduced pressure and elevated temperatures (150° C./5 mbar) to produce a colorless, very viscous fluid with average structure $^{Eu}MD_{45}D_9{}^{Me,EC}D_{11}{}^{Me,APE}M_{Eu}$.

Example 3

Synthesis of (4-hydroxy-3-methoxyphenyl)propyl-terminated polysiloxane terpolymer, $^{Eu}MD_{45}D_{10}{}^{Me,}{}_{EC}M^{Eu}$ A 250 ml round bottom flask was charged with 100 grams of $^{Eu}MD_{45}D_{10}{}^{H,Me}M^{Eu}$ prepared according to the procedure of Comparative Example A was heated and a stoichiometric amount of a mixture of vinyl carbazole and 0.85 grams of a platinum catalyst and was maintained at 120° C. for 10 hours. Thereafter, the reaction mixture was cooled and filtered through diatomaceous earth. The residual materials were removed under reduced pressure and elevated temperatures.

Example 4

Synthesis of (4-hydroxy-3-methoxyphenyl)propylene-terminated polysiloxane terpolymer, $^{Eu}MD_{45}D_{10}{}^{Me,EC}D_{110}{}^{Me,APE}M^{Eu}$ The compound was prepared in accordance with Example 2, except the molar ratio of vinlyl carbazole and allyl phenyl ether was 1:1.

The properties of the compounds prepared in Comparative Example A and Examples 2 to 4 are presented in Table 2. The refractive index of resulting material was measured to be 1.4893-1.5086, as illustrated in Table 2. These techniques were used to synthesize other substituted phenylalkyl-terminated polysiloxanes co- or terpolymers according to embodiments of the current invention.

TABLE 2

Characteristics of 4-hydroxy-3-methoxyphenylpropyl-terminated polysiloxane (different substituents)

| Reactions | $R_1$ | $R_2$ | $R_3$ | D-units (x, y, z) | MW | PDI | $T_d$ (° C.) | $T_g$ (° C.) | RI |
|---|---|---|---|---|---|---|---|---|---|
| Comparative Example A | Me/Me | — | — | x = 45, y = 0, z = 0 | 5,700 | 1.32 | 448 | −118 | 1.4210 |
| Example 2 | Me/Me | Me/EC | Me/APE | x = 45, y = 9, z = 11 | 13,100 | >2.0 | 530 | −125 | 1.5086 |

TABLE 2-continued

Characteristics of 4-hydroxy-3-methoxyphenylpropyl-terminated polysiloxane (different substituents)

| Reactions | $R_1$ | $R_2$ | $R_3$ | D-units (x, y, z) | MW | PDI | $T_d$ (° C.) | $T_g$ (° C.) | RI |
|---|---|---|---|---|---|---|---|---|---|
| Example 3 | Me/Me | Me/EC | — | x = 45, y = 10, z = 0 | 8692 | >2.0 | 476 | −122 | 1.4986 |
| Example 4 | Me/Me | Me/EC | Me/APE | x = 45, y = 10, z = 10 | 12,823 | >2.0 | 503 | −120 | 1.5164 |

Me: Methyl;
EC: ethylenecarbazole;
APE: propylenephenylether

Example 5

Synthesis of Polycarbonate-Polysiloxane Copolymers 9.132 grams of bisphenol-A (BPA), 2.283 g of siloxane fluid of examples 1, 2, 3, and 5 as per Table 2 and 0.113 gram of phase transfer catalyst (PTAC: phenyltriethylammonium chloride) were added to the four necked round bottomed flask containing 50 mL each of water and dichloromethane (DCM). 7.56 grams of triphosgene was weighed in a glass vial under nitrogen atmosphere, dissolved in 25 mL DCM and transferred to the addition funnel connected to the round bottom flask. 25 mL of 25-30 weight percent NaOH solution was transferred to second additional funnel fixed in the reactor. Both triphosgene and NaOH solution were added to the reaction mixture simultaneously with vigorous stirring at 300-400 rpm using a stirring blade. The NaOH addition was carefully done in such a way that pH of the reaction mixture was maintained between pH values of 5 and 6. After addition, the stirring was continued for another 40 to 60 minutes.

Thereafter, an amount of NaOH solution required to increase the pH to 10-11 was added. The reaction mixture was stirred for another 5-10 minutes. 0.2123 grams of 4-cumyl phenol (pCP) and 50.6 milligrams of triethyl amine (TEA) were added. The mixture was stirred for another 5 to 10 minutes and the pH was increased to 12 by adding aqueous NaOH solution. The reaction was stopped and the organic layer was separated from the aqueous layer using a separating funnel. The polymer (organic layer) was washed with 1N HCl and precipitated in 3-4 liters of methanol. The final product was dried overnight in a vacuum oven at $10^{-3}$ mm Hg pressure and 60-70° C.

TABLE 3

Compositional details of Polysiloxane-Polycarbonate Polymer

| Samples | $MW_n$ | PDI | $T_d$ (° C.) | $T_g$ (° C.) |
|---|---|---|---|---|
| Polymer I: Polycarbonate-Polysiloxane (Example-2) polymer | 65743 | 2.33 | 633 | 148 |
| Polymer II: Polycarbonate-Polysiloxane (Example-3) polymer | 100130 | 2.59 | 431 | 145 |
| Polymer III: Polycarbonate-Polysiloxane (Example-4) polymer | 56695 | 1.40 | 650 | 147 |
| Polymer IV: Polycarbonate-Polysiloxane (Comparative Example A) polymer | 64852 | 1.50 | 648 | 149 |

Example 6

Blending of Polycarbonate-Homopolymer and Synthesized Polycarbonate-Polysiloxane Polymers Up to 25 weight percent of the polycarbonate-polysiloxane polymers made were melt-blended in Haake MiniLab II as a mini extruder with approximately 75 weight percent of polycarbonate-homopolymer at 290° C. for 7 minutes. Different geometries of test samples such as tensile bar, dumbbell, disc etc. were compression molded using injection molding to get the desired plastic article.

Notched Izod Tests:

This test procedure was based on the ISO 180/1A method. The results of the test were reported in terms of energy absorbed per unit of specimen width, and expressed in Izod Notch Energies ($KJ/m^2$). Typically the final test result is calculated as the average of test results of five test bars.

TABLE 4

Izod Test Results

| Blend Type | Izod test at −40° C. |
|---|---|
| Blend 1: Polymer I + Polycarbonate Homopolymer | 11.9 |
| Blend 2: Polymer IV + Polycarbonate Homopolymer | 16.0 |
| Polycarbonate Homopolymer | 12.9 |

As the Izod test temperature lowers below the room temperature, the energy absorbed by polycarbonate-polysiloxane copolymers of the invention incorporated blends are significantly higher than the polycarbonate homopolymer.

Optical Property Tests:

Haze value of the molded (blend compositions) article was measured by light transmission utilizing the Haze-Guard Plus haze meter from BYK-Gardner (a color difference meter) according to the method of ASTM D1003-00. The instrument was first calibrated according to the manufacturer's instructions followed by placement of the sample on the transmission light beam of the pre-calibrated meter and the transparency, haze value and yellowness index (YI) were recorded from three different specimen locations and averaged (see Table 5).

TABLE 5

Optical property test results

| Blend Type | Transparency | Haze | YI |
|---|---|---|---|
| Blend 1: Polymer I + Polycarbonate Homopolymer | 74.3 | 22.7 | 19.0 |
| Blend 2: Polymer IV + Polycarbonate Homopolymer | 77.0 | 18.5 | 18.8 |
| Polycarbonate Homopolymer | 87.6 | 11.7 | 1.31 |

As shown in Table 5 above, the blend types of (blend 2) are generally having comparable optical properties when compared with polycarbonate homopolymer.

Flammability Tests:

In one embodiment, the thermoplastic compositions are of particular utility in the manufacture flame retardant articles that pass the UL94 vertical burn tests. In the UL94 vertical burn test, a flame is applied to a vertically fastened test specimen placed above a cotton wool pad. Flammability tests were performed following the procedure of Underwriter's Laboratory Bulletin 94 entitled "Tests for Flammability of Plastic Materials, UL94." According to this procedure, materials may be classified as HB, V0, UL94 V1, V2, 5VA and/or 5VB on the basis of the test results obtained for five samples as per the following related criteria and presented in Table 6.

TABLE 6

Flammability test results criteria conditions:

| Criteria Conditions | V-0 | V-1 | V-2 |
| --- | --- | --- | --- |
| Afterflame time for each individual specimen t1 or t2 | ≤10 s | ≤30 s | ≤30 s |
| Total afterflame time for any condition set (t1 plus t2 for the 5 specimens) | ≤50 s | ≤250 s | ≤250 s |
| Afterflame plus afterglow time for each individual specimen after the second flame application (t2 + t3) | ≤30 s | ≤60 s | ≤60 s |
| Afterflame or afterglow of any specimen up to the holding clamp | No | No | No |
| Cotton indicator ignited by flaming particles or drops | No | No | Yes |

TABLE 7

Flammability Test results for Polycarbonate Homopolymer and Polycarbonate with Polycarbonate-Polysiloxane Polymer blends
Specimens nominal thickness 4 mm
Standard UL94

| Blend Type | Av (t1 + t2) s | Remarks-1 | Av (t2 + t3) s | Remarks-2 | Type |
| --- | --- | --- | --- | --- | --- |
| Blend 1: Polymer I + Polycarbonate Homopolymer | 16.6 | Sample didn't drip | 28.6 | Sample didn't drip | V1 |
| Blend 2: Polymer IV + Polycarbonate Homopolymer | 8.6 | Sample didn't drip | 14.3 | Sample didn't drip | V0 |
| Polycarbonate Homopolymer | 16 | Sample didn't drip | 21.3 | Sample dripped particles that ignite cotton | V2 |

As shown in Table 7 above, the blend types of (blend 2) are generally having better flame resistance than Polycarbonate Homopolymer. Considering the average flame out time after the lightings, the blend type (blend 2) with the instant trioligomeric multifunctional siloxane fluid showed extremely improved flame resistance. Moreover, none of the blends prepared by using instant copolymers show dripped particles and cotton ignition.

Comparative Tracking Index:

In one embodiment, the thermoplastic compositions (or plastic article) are of particular utility in the manufacture of insulating property that pass the ASTM D3638, UL746A tests. The Comparative Tracking Index (CTI) indicates the test voltage against the number of drops to track for tested samples. It is typically used in the art to measure the electrical breakdown (tracking) properties of an insulating material. Tracking is a measure of electrical breakdown on the surface of an insulating material. A large voltage difference gradually creates a conductive leakage path across the surface of the material by forming a carbonized track. The CTI testing procedure was carried as described in ASTM D3638 test method (UL 746 A). Briefly, the testing procedure involved adding 50 drops of a 0.1 weight percent ammonium chloride solution drop-wise to the surface of the material (3 mm thickness, disc), followed by determination of the maximum voltage at which failure occurred, the results of which can be seen in Table 8.

TABLE 8

Comparative Tracking Index results for Polycarbonate Homopolymer and Polycarbonate with Polycarbonate-Polysiloxane blends
Specimens nominal thickness 3 mm disc
Standard ASTM D3638, UL746A

| Blend Type | Voltage (V) | Av. # of Drops @ 24° C. (RT) | Remarks |
| --- | --- | --- | --- |
| Blend 1: Polymer I + Polycarbonate Homopolymer | 250 | 50 | Sample Flamed |
| Blend 2: Polymer IV + Polycarbonate Homopolymer | 250 | 53 | Sample Flamed |
| Polycarbonate Homopolymer | 250 | 93 | Sample Flamed & Eroded |

It will be appreciated that variants of the above-disclosed and other features and functions or alternatives thereof, may be combined into other different systems or applications.

Various presently unforeseen or unanticipated alternatives, modifications, variations, or improvements therein may be subsequently made by those skilled in the art which are also encompassed by the following claims.

What is claimed is:

1. A substituted phenyl-terminated polysiloxane terpolymer comprising the structure:

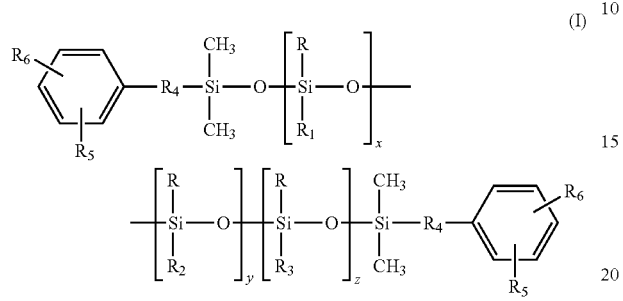

wherein R, $R_1$, $R_2$ and $R_3$ are independently a linear or branched aliphatic group containing from 1 to 20 carbon atoms, a substituted or unsubstituted aryl group containing 6 to 16 carbon atoms, an alicyclic group containing 3 to 16 carbon atoms, a heteronuclear aromatic group containing 3 to 16 carbon atoms, a hydrocarbyl group having from 3 to 16 carbon atoms and containing at least one heteroatom of oxygen, nitrogen or sulfur and/or containing at least one ester, nitrile or halo group, wherein $R_1$, $R_2$, and $R_3$ are not the same group; $R_4$ is independently a divalent linear or branched alkylene group having from 1 to 10 carbon atoms, an aralkylene group having from 6 to 12 carbon atoms, an unsubstituted or substituted arylene group having from 6 to 18 carbon atoms, hydrocarbylene group having from 2 to 10 carbon atoms and containing at least one heteroatom of oxygen or a covalent single bond; $R_5$ is independently a hydrogen, a halogen, an aliphatic group containing from 1 to 12 carbon atoms, an aromatic group containing from 6 to 12 carbon atoms, an alkoxy group containing form 1 to 12 carbon atoms or an aryloxy group containing from 6 to 12 carbon atoms; $R_6$ is independently a hydroxyl group, an amine group, a carboxylic acid chloride group or a sulfonyl halide group; x is an integer from 1 to 300; y is an integer from 1 to 100; z is an integer from 1 to 50.

2. A composition comprising the substituted phenyl-terminated polysiloxane terpolymer of claim 1, further comprising at least one polymer selected from the group consisting of: polycarbonate homopolymers, polycarbonate copolymers, polycarbonate-polyesters, polyesters, polysulfones, polyethersulfones, polyetheretherketones, polyimides, polyetherimides, and combinations thereof.

3. An article comprising the composition of claim 2, wherein the article is one or more of a mobile phone housing, frozen food service equipment, a helmet, an automotive windshield, a motorcycle windshield, an automotive sunroof, a dashboard, a headlamp, or an electric screen.

4. A method of making an article comprising: molding, shaping, or forming the composition of claim 2 to form the article.

5. A method of preparing a substituted phenyl-terminated polysiloxane co- or terpolymer, comprising:
(a) reacting a cyclic siloxane with disiloxane hydride in presence of acidic and/or basic catalyst to provide for a hydride-terminated polysiloxane having the structure represented by the structural Formula (III):

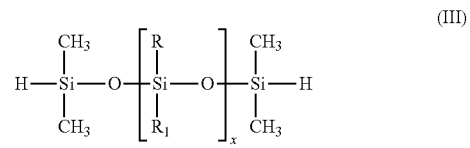

wherein R and $R_1$ are independently a linear or branched aliphatic group containing from 1 to 20 carbon atoms, a substituted or unsubstituted aryl group containing 6 to 16 carbon atoms, an alicyclic group containing 3 to 16 carbon atoms, a heteronuclear aromatic group containing 3 to 16 carbon atoms, a hydrocarbyl group having from 3 to 16 carbon atoms and containing at least one heteroatom of oxygen, nitrogen or sulfur and/or containing at least one ester, nitrile or halo group; x is an integer from 1 to 300;
(b) hydrosilylating the hydride terminated polysiloxane of step (a) with a substituted phenyl compound having and carbon-carbon double bond and at least one functional group selected from the group consisting of hydroxyl group, an amine group, a carboxylic acid chloride group and a sulfonyl halide group to obtain a substituted phenylalkyl-terminated polysiloxane;
(c) equilibrating the phenylalkyl-terminated polysiloxane of step (b) with a hydride substituted polysiloxane and/or cyclic siloxane to make a substituted phenylalkyl-terminated polysiloxane containing at least one Si—H (silicon hydride) group and is represented by the structural Formula (IV):

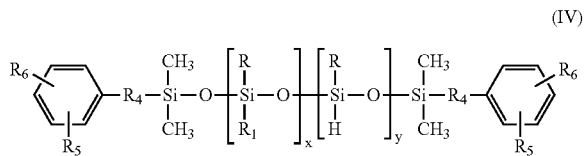

wherein R and $R^1$ are independently a linear or branched aliphatic group containing from 1 to 20 carbon atoms, a substituted or unsubstituted aryl group containing 6 to 16 carbon atoms, an alicyclic group containing 3 to 16 carbon atoms, a heteronuclear aromatic group containing 3 to 16 carbon atoms, a hydrocarbyl group having from 3 to 16 carbon atoms and containing at least one heteroatom of oxygen, nitrogen or sulfur and/or containing at least one ester, nitrile or halo group; $R_4$ is independently a divalent linear or branched alkylene group having from 1 to 10 carbon atoms, an aralkylene group having from 6 to 12 carbon atoms, an unsubstituted or substituted arylene group having from 6 to 18 carbon atoms, hydrocarbylene group having from 2 to 10 carbon atoms and containing at least one heteroatom of oxygen to form an ether or a covalent single bond; $R_5$ is independently a hydrogen, a halogen, an aliphatic group containing from 1 to 12 carbon atoms, an aromatic group containing from 6 to 12 carbon atoms, an alkoxy group containing form 1 to 12 carbon atoms or an aryloxy group containing from 6 to 12 carbon atoms; $R_6$ is independently a hydroxyl group, an amine group, a carboxylic acid chloride group or a sulfonyl halide group; x is an integer from 1 to 300; y is an integer from 1 to 100;

(d) hydrosilylating the substituted phenylalkyl-terminated polysiloxane containing at least one Si—H (silicon hydride) group with a compound containing a carbon-carbon double bond and a linear or branched aliphatic group containing from 1 to 18 carbon atoms, a substituted or unsubstituted aryl group containing 6 to 14 carbon atoms, an alicyclic group containing 3 to 14 carbon atoms, a heteronuclear aromatic group containing 3 to 14 carbon atoms, a hydrocarbyl group having from 3 to 14 carbon atoms and containing at least one heteroatom of oxygen, nitrogen or sulfur and/or containing at least one ester, nitrile or halo group to obtain a substituted phenylalkyl-terminated polysiloxane copolymer having the structural Formula (V):

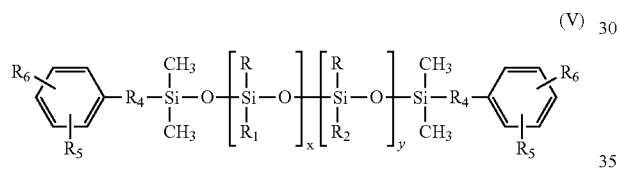

(V)

wherein R and $R_1$ are independently an aliphatic group containing from 1 to 20 carbon atoms, a substituted or unsubstituted aryl group containing 6 to 16 carbon atoms, an alicyclic group containing 3 to 16 carbon atoms, a heteronuclear aromatic group containing 3 to 16 carbon atoms, a hydrocarbyl group having from 3 to 16 carbon atoms and containing at least one heteroatom of oxygen, nitrogen or sulfur and/or containing at least one ester, nitrile or halo group; $R_2$ is aliphatic group containing from 2 to 20 carbon atoms, a substituted or unsubstituted aryl group containing 8 to 16 carbon atoms, an alicyclic group containing 5 to 16 carbon atoms, a heteronuclear aromatic group containing 5 to 16 carbon atoms, a hydrocarbyl group having from 5 to 16 carbon atoms and containing at least one heteroatom of oxygen, nitrogen or sulfur and/or containing at least one ester, nitrile or halo group. $R_1$ and $R_2$ are not the same; $R_4$ is independently a divalent linear or branched alkylene group having from 1 to 10 carbon atoms, an aralkylene group having from 6 to 12 carbon atoms, an unsubstituted or substituted arylene group having from 6 to 18 carbon atoms, hydrocarbylene group having from 2 to 10 carbon atoms and containing at least one heteroatom of oxygen or a covalent single bond; $R_5$ is independently a hydrogen, a halogen, an aliphatic group containing from 1 to 12 carbon atoms, an aromatic group containing from 6 to 12 carbon atoms, an alkoxy group containing form 1 to 12 carbon atoms or an aryloxy group containing from 6 to 12 carbon atoms; $R_6$ is independently a hydroxyl group, an amine group, a carboxylic acid chloride group or a sulfonyl halide group; x is from 1 to 300; y is from 1 to 100;

(e) equilibrating the substituted phenylalkyl-terminated polysiloxane copolymer of step (d) with a hydride substituted polysiloxane and/or cyclic siloxane to provide for a substituted phenylalkyl-terminated polysiloxane terpolymer containing at least one Si—H (silicon hydride) group and having the structural Formula (VI):

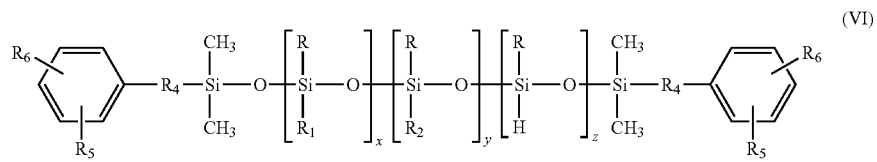

(VI)

wherein R and $R_1$ are independently an aliphatic group containing from 1 to 20 carbon atoms, a substituted or unsubstituted aryl group containing 6 to 16 carbon atoms, an alicyclic group containing 3 to 16 carbon atoms, a heteronuclear aromatic group containing 3 to 16 carbon atoms, a hydrocarbyl group having from 3 to 16 carbon atoms and containing at least one heteroatom of oxygen, nitrogen or sulfur and/or containing at least one ester, nitrile or halo group; $R_2$ is aliphatic group containing from 2 to 20 carbon atoms, a substituted or unsubstituted aryl group containing 8 to 16 carbon atoms, an alicyclic group containing 5 to 16 carbon atoms, a heteronuclear aromatic group containing 5 to 16 carbon atoms, a hydrocarbyl group having from 5 to 16 carbon atoms and containing at least one heteroatom of oxygen, nitrogen or sulfur and/or containing at least one ester, nitrile or halo group. $R_1$ and $R_2$ are not the same; $R_4$ is independently a divalent linear or branched alkylene group having from 1 to 10 carbon atoms, an aralkylene group having from 6 to 12 carbon atoms, an unsubstituted or substituted arylene group having from 6 to 18 carbon atoms, hydrocarbylene group having from 2 to 10 carbon atoms and containing at least one heteroatom of oxygen or a covalent single bond; $R_5$ is independently a hydrogen, a halogen, an aliphatic group containing from 1 to 12 carbon atoms, an aromatic group containing from 6 to 12 carbon atoms, an alkoxy group containing form 1 to 12 carbon atoms or an aryloxy group containing from 6 to 12 carbon atoms; $R_6$ is independently a hydroxyl group, an amine group, a carboxylic acid chloride group or a sulfonyl halide group; x is from 1 to 300; y is from 1 to 100 and z is 1 to 50; and (f) hydrosilylating the substituted phenylalkyl-terminated polysiloxane terpolymer containing at least one Si—H (silicon hydride) group of step (e) with a compound containing a carbon-carbon double bond and a linear or branched aliphatic group containing from 1 to 18 carbon atoms, a substituted or unsubstituted aryl group containing 6 to 14 carbon atoms, an alicyclic group containing 3 to 14 carbon atoms, a heteronuclear aromatic group containing 3 to 14 carbon atoms, a hydrocarbyl group having from 3 to 14 carbon atoms and containing at least one heteroatom of oxygen, nitrogen or sulfur and/or containing at least one ester, nitrile or halo group to obtain a substituted phenylalkyl-terminated polysiloxane terpolymer having the structural Formula (VII):

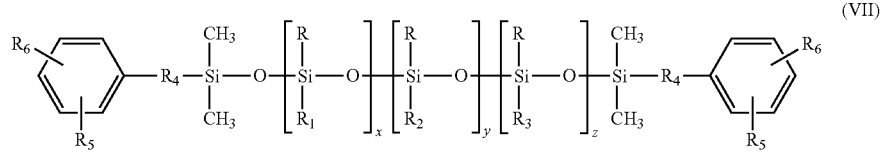

wherein R and $R_1$ are independently a linear or branched aliphatic group containing from 1 to 20 carbon atoms, a substituted or unsubstituted aryl group containing 6 to 16 carbon atoms, an alicyclic group containing 3 to 16 carbon atoms, a heteronuclear aromatic group containing 3 to 16 carbon atoms, a hydrocarbyl group having from 3 to 16 carbon atoms and containing at least one heteroatom of oxygen, nitrogen and/or sulfur or containing at least one ester, nitrile or halo group; $R_2$ and $R_3$ are independently a linear or branched aliphatic group containing from 2 to 20 carbon atoms, a substituted or unsubstituted aryl group containing 8 to 16 carbon atoms, an alicyclic group containing 5 to 16 carbon atoms, a heteronuclear aromatic group containing 5 to 16 carbon atoms, a hydrocarbyl group having from 5 to 16 carbon atoms and containing at least one heteroatom of oxygen, nitrogen or sulfur and/or containing at least one ester, nitrile or halo group, wherein $R_1$, $R_2$, and $R_3$ are not the same; $R_4$ is independently a divalent linear or branched alkylene group having from 1 to 10 carbon atoms, an aralkylene group having from 6 to 12 carbon atoms, an unsubstituted or substituted arylene group having from 6 to 18 carbon atoms, hydrocarbylene group having from 2 to 10 carbon atoms and containing at least one heteroatom of oxygen or a covalent single bond; $R_5$ is independently a hydrogen, a halogen, an aliphatic group containing from 1 to 12 carbon atoms, an aromatic group containing from 6 to 12 carbon atoms, an alkoxy group containing form 1 to 12 carbon atoms or an aryloxy group containing from 6 to 12 carbon atoms; $R_6$ is independently a hydroxyl group, an amine group, a carboxylic acid chloride group or a sulfonyl halide group; x is from 1 to 300; y is from 1 to 100; z is from 1 to 50.

6. The method of claim 5, further comprising:
purifying the substituted phenyl-terminated polysiloxane co- or terpolymer.

7. A polysiloxane-thermoplastic polymer comprising a structural unit represented by the structural formula:

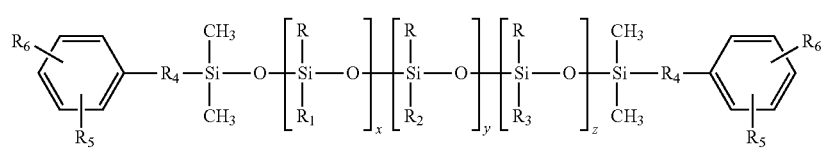

wherein R, $R_1$, $R_2$ and $R_3$ are independently a linear or branched aliphatic group containing from 1 to 20 carbon atoms, a substituted or unsubstituted aryl group containing 6 to 16 carbon atoms, an alicyclic group containing 3 to 16 carbon atoms, a heteronuclear aromatic group containing 3 to 16 carbon atoms, a hydrocarbyl group having from 3 to 16 carbon atoms and containing at least one heteroatom of oxygen, nitrogen or sulfur and/or containing at least one ester, nitrile or halo group, wherein $R_1$, $R_2$, and $R_3$ are not the same group; $R_4$ is independently a divalent linear or branched alkylene group having from 1 to 10 carbon atoms, an aralkylene group having from 6 to 12 carbon atoms, an unsubstituted or substituted arylene group having from 6 to 18 carbon atoms, hydrocarbylene group having from 2 to 10 carbon atoms and containing at least one heteroatom of oxygen or a covalent single bond; $R_5$ is independently a hydrogen, a halogen, an aliphatic group containing from 1 to 12 carbon atoms, an aromatic group containing from 6 to 12 carbon atoms, an alkoxy group containing form 1 to 12 carbon atoms or an aryloxy group containing from 6 to 12 carbon atoms; $R_6$ is independently a residue of hydroxyl group, an amine group, a carboxylic acid chloride group or a sulfonyl halide group; x is an integer from 1 to 300; y is an integer from 1 to 100; z is an integer from 1 to 50.

8. The polysiloxane-thermoplastic resin polymer of claim 7, further comprising a structural unit having the Formula (VIII):

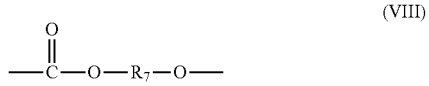

wherein each $R_7$ is independently a hydrocarbon group containing from 1 to 60 carbon atoms, a divalent hydrocarbon group, or a group derived from the structural unit of Formula (II):

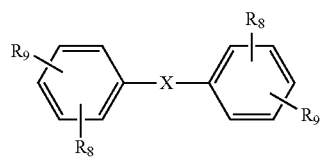

(II)

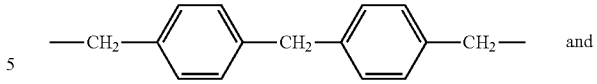

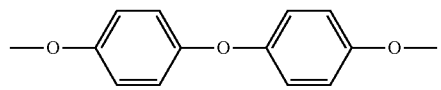

where $R_8$ is independently a hydrogen, a halogen, an aliphatic group having from 1 to 6 carbon atoms, an aromatic group having 6 to 8 carbon atoms, an alkoxy group having from 1 to 6 carbon atoms, or an aryloxy group; and $R_9$ is independently a residue of a hydroxyl group, an amine group, an acid chloride group, or a sulfonyl halide group; and X is selected from the group consisting of:

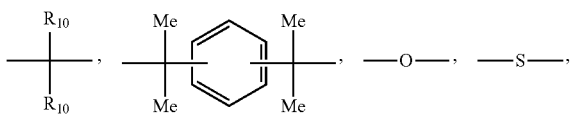

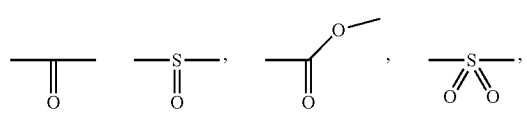

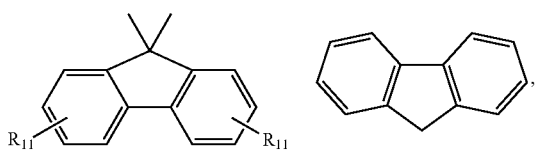

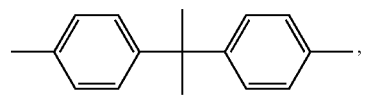

wherein $R_{10}$ and $R_{11}$ are independently a hydrogen, a halogen, an alkyl group having from 1 to 18 carbon atoms, an aryl group having from 3 to 14 carbon atoms, an aryloxy group having from 6 to 10 carbon atoms, an aralkyl group having from 7 to 20 carbon atoms, an alkoxy group having from 1 to 10 carbon atoms, a cycloalkyl group having from 6 to 20 carbon atoms, a cycloalkoxy group having from 6 to 20 carbon atoms, an alkenyl group having from 2 to 10 carbon atoms, an aralkyloxy group, a nitro group, an aldehyde group, a cyano group, or a carboxyl group.

9. The polysiloxane-thermoplastic resin polymer of claim 7, wherein $R_3$ is independently a linear alkyl chain from 4 to 15 carbon atoms, a substituted or an unsubstituted aromatic group, or a group derived from vinyl carbazole, allylphenylether, vinylbenzyl chloride, allylmethacrylate, diphenylethylene, vinylbenzocyclobutene, allylphenylsulfide, vinylbenzoate, chlorostyrene, $R_9$ is hydroxy group and $R_{10}$ is alkyl group of 1 to 6 carbon atoms.

10. A composition comprising the polysiloxane-thermoplastic resin polymer of claim 7 and at least one of a polycarbonate homopolymer, a polycarbonate-polyester, a polyester, a polysulfone, a polyethersulfone, a polyetheretherketone, a polyimide, a polyetherimide, a polycarbonate copolymer, or a combination thereof.

11. An article comprising the composition of claim 10, wherein the article is one or more of a mobile phone housing, frozen food service equipment, a helmet, an automotive windshield, a motorcycle windshield, an automotive sunroof, a dashboard, a headlamp, or an electric screen.

12. A method of making an article comprising: molding, shaping, or forming the composition of claim 10 to obtain the article.

13. A method of preparing a polycarbonate-polysiloxane copolymer, said method comprising polymerizing a substituted phenyl terminated polysiloxane terpolymer of the Formula (I):

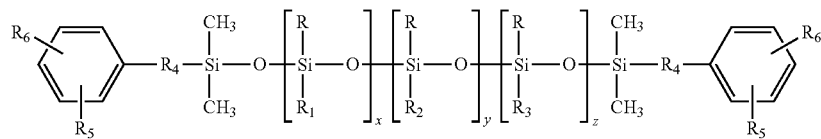

(I)

wherein R, $R_1$, $R_2$ and $R_3$ are independently a linear or branched aliphatic group containing from 1 to 20 carbon atoms, a substituted or unsubstituted aryl group containing 6 to 16 carbon atoms, an alicyclic group containing 3 to 16 carbon atoms, a heteronuclear aromatic group containing 3 to 16 carbon atoms, a hydrocarbyl group having from 3 to 16 carbon atoms and containing at least one heteroatom of oxygen, nitrogen or sulfur and/or containing at least one ester, nitrile or halo group, wherein $R_1$, $R_2$, and $R_3$ are not the same group; $R_4$ is independently a divalent linear or branched alkylene group having from 1 to 10 carbon atoms, an aralkylene group having from 6 to 12 carbon atoms, an unsubstituted or substituted arylene group having from 6 to 18 carbon atoms, hydrocarbylene group having from 2 to 10 carbon atoms and containing at least one heteroatom of oxygen or a covalent single bond; $R_5$ is independently a hydrogen, a halogen, an aliphatic group containing from 1 to 12 carbon atoms, an aromatic group containing from 6 to 12 carbon atoms, an alkoxy group containing form 1 to 12 carbon atoms or an aryloxy group containing from 6 to 12 carbon atoms; $R_6$ is independently a hydroxyl group, an amine group, a carboxylic acid chloride group or a sulfonyl halide group; x is an integer from 1 to 300; y is an integer from 1 to 100; z is an integer from 1 to 50, with a compound of Formula (II):

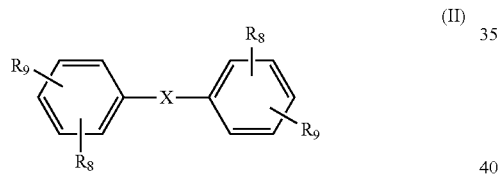

(II)

where $R_8$ is independently a hydrogen, a halogen, an aliphatic group having from 1 to 6 carbon atoms, an aromatic group having from 6 to 8 carbon atoms, an alkoxy group having from 1 to 6 carbon atoms, or an aryloxy group; and $R_9$ is independently a residue of a hydroxyl group, an amino group, a carboxylic chloride group, or a sulfonyl halide group; and X is selected from the group consisting of:

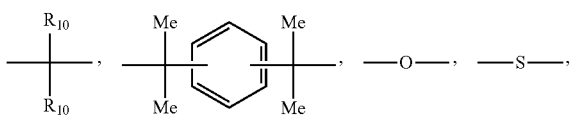

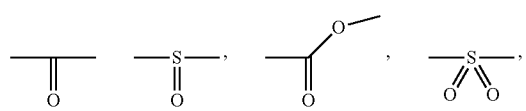

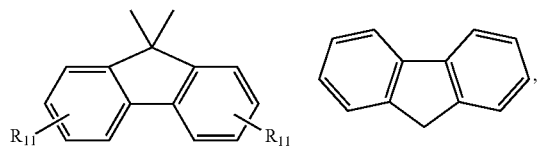

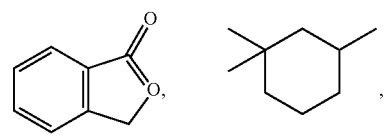

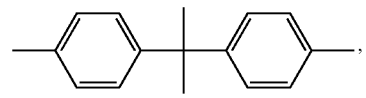

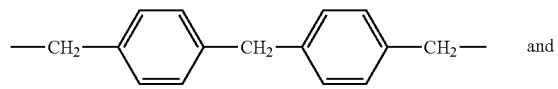

and

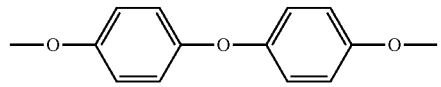

wherein $R_{10}$, $R_{11}$ are independently a hydrogen, halogen, an alkyl group having from 1 to 18 carbon atoms, an aryl group having from 3 to 14 carbon atoms, an aryloxy group having from 6 to 10 carbon atoms, an aralkyl group having from 7 to 20 carbon atoms, an alkoxy group having from 1 to 10 carbon atoms, a cycloalkyl group having from 6 to 20 carbon atoms, a cycloalkoxy group having from 6 to 20 carbon atoms, an alkenyl group having from 2 to 10 carbon atoms, an aralkyloxy group, a nitro group, an aldehyde group, a cyano group, or a carboxyl group in the presence of at least one carbonate precursor.

14. The method of claim 13, wherein the carbonate precursor is chosen from phosgene, diphosgene, triphosgene and diarylcarbonates, bis(methylsalicyl)carbonate, or a combination thereof.

15. The method of claim 13, wherein the polymerizing step is an interfacial polymerization process conducted in the presence of a solvent and optionally one or more catalysts.

16. The method of claim 13, wherein the polymerizing step is an interfacial polymerization process conducted in the presence of a solvent, a caustic, and optionally one or more catalysts, and wherein the carbonate precursor is chosen from phosgene, diphosgene, triphosgene or diarylcarbonates, bis(methylsalicyl)carbonate, or a combination thereof.

17. The method of claim 13, wherein the polymerizing step comprises reacting a dihydroxy aromatic compound with triphosgene in a biphasic solvent in the presence of a phase transfer catalyst to form a bischloroformate; and adding the substituted phenyl-terminated polysiloxane co- or terpolymer to form the polysiloxane-thermoplastic resin polymer.

18. The method of claim 17, wherein a plurality of bischloroformates of the dihydroxy aromatic compound are formed in a tube reactor, and then added into an interfacial polycondensation reactor with a catalyst.

19. A substituted phenyl-terminated polysiloxane co-polymer comprising the structure:

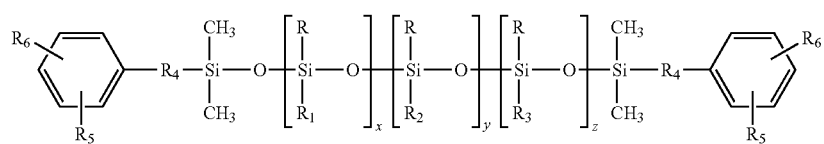

wherein R, $R_1$ and $R_3$ are independently a linear or branched aliphatic group containing from 1 to 20 carbon atoms, a substituted or unsubsstituted aryl group containing 6 to 16 carbon atoms, an alicyclic group containing 3 to 16 carbon atoms, a heteronuclear aromatic group containing 3 to 16 carbon atoms, a hydrocarbyl group having from 3 to 16 carbon atoms and containing at least one heteroatom of oxygen, nitrogen or sulfur and/or containing at least one ester, nitrile or halo group; $R_2$ is a heteronuclear aromatic group containing 3 to 16 carbon atoms, wherein $R_1$, $R_2$ and $R_3$ are not the same group; $R_4$ is independently a divalent linear or branched alkylene group having from 1 to 10 carbon atoms, an aralkylene group having from 6 to 12 carbon atoms, an unsubstituted or substituted arylene group having from 6 to 18 carbon atoms, hydrocarbylene group having from 2 to 10 carbon atoms and containing at least one heteroatom of oxygen or a covalent single bond; $R_5$ is independently a hydrogen, a halogen, an aliphatic group containing from 1 to 12 carbon atoms, an aromatic group containing from 6 to 12 carbon atoms, an alkoxy group containing form 1 to 12 carbon atoms or an aryloxy group containing from 6 to 12 carbon atoms; $R_6$ is independently a hydroxyl group, an amine group, a carboxylic acid chloride group or a sulfonyl halide group; x is an integer from 1 to 300; y is an integer from 1 to 100; z is 0.

20. A composition comprising the substituted phenyl-terminated polysiloxane co-polymer of claim 19, further comprising at least one polymer selected from the group consisting of: polycarbonate homopolymers, polycarbonate copolymers, polycarbonate-polyesters, polyesters, polysulfones, polyethersulfones, polyetheretherketones, polyimides, polyetherimides, and combinations thereof.

21. A polysiloxane-thermoplastic polymer comprising a structural unit represented by the structural formula:

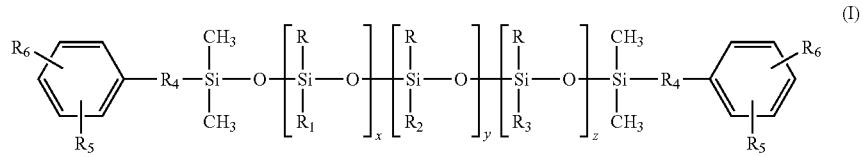

wherein R, $R_1$, and $R_3$ are independently a linear or branched aliphatic group containing from 1 to 20 carbon atoms, a substituted or unsubstituted aryl group containing 6 to 16 carbon atoms, an alicyclic group containing 3 to 16 carbon atoms, a heteronuclear aromatic group containing 3 to 16 carbon atoms, a hydrocarbyl group having from 3 to 16 carbon atoms and containing at least one heteroatom of oxygen, nitrogen or sulfur and/or containing at least one ester, nitrile or halo group; $R_2$ is a heteronuclear aromatic compound, wherein $R_1$, $R_2$, and $R_3$ are not the same group; $R_4$ is independently a divalent linear or branched alkylene group having from 1 to 10 carbon atoms, an aralkylene group having from 6 to 12 carbon atoms, an unsubstituted or substituted arylene group having from 6 to 18 carbon atoms, hydrocarbylene group having from 2 to 10 carbon atoms and containing at least one heteroatom of oxygen or a covalent single bond; $R_5$ is independently a hydrogen, a halogen, an aliphatic group containing from 1 to 12 carbon atoms, an aromatic group containing from 6 to 12 carbon atoms, an alkoxy group containing form 1 to 12 carbon atoms or an aryloxy group containing from 6 to 12 carbon atoms; $R_6$ is independently a residue of a hydroxyl group, an amine group, a carboxylic acid chloride group or a sulfonyl halide group; x is an integer from 1 to 300; y is an integer from 1 to 100; z is 0.

* * * * *